United States Patent
Raup

(10) Patent No.: US 6,295,796 B1
(45) Date of Patent: Oct. 2, 2001

(54) METHOD OF HARVESTING CORN

(76) Inventor: Charles Raup, P.O. Box 45, Thomasboro, IL (US) 61878

( * ) Notice: Subject to any disclaimer, the term of this patent is extended or adjusted under 35 U.S.C. 154(b) by 0 days.

(21) Appl. No.: 09/460,491

(22) Filed: Dec. 14, 1999

Related U.S. Application Data

(62) Division of application No. 08/933,528, filed on Sep. 18, 1997, now abandoned.

(51) Int. Cl.[7] .................................................. A01D 45/02
(52) U.S. Cl. ........................................... 56/61; 56/1
(58) Field of Search .................................. 56/53–60, 61, 56/103, 94, 36, 105, 119, 503, 51; 460/119

(56) References Cited

U.S. PATENT DOCUMENTS

| | | | |
|---|---|---|---|
| 3,673,775 | * 7/1972 | Jones | 56/14.7 |
| 4,223,846 | * 9/1980 | Priepke et al. | 241/60 |
| 4,236,369 | * 12/1980 | Decoene | 56/60 |
| 5,105,609 | * 4/1992 | Covington et al. | 56/28 X |

* cited by examiner

Primary Examiner—Robert E. Pezzuto
(74) Attorney, Agent, or Firm—Michael Berns; Berns Law Office

(57) ABSTRACT

The invention relates to a method of removing selected rows of corn out of a corn field which is particularly important for removing male rows of corn in a field of seed corn. The female seed corn rows are left undamaged, as a harvester passes over the top of the seed corn. Seed corn is grown with one or two rows of a male corn which pollinate three to five rows of the female seed corn. Once the pollination occurs, the male corn is unwanted and can cause contamination of the species of corn.

28 Claims, 3 Drawing Sheets

METHOD OF HARVESTING CORN

This application is a Division of Ser. No. 08/933,528 filed Sep. 18, 1997, Abandoned.

BACKGROUND OF THE INVENTION

The invention relates to a method of removing selected rows of corn out of a corn field which is particularly important for removing male rows of corn in a field of seed corn. The female seed corn rows are left undamaged, as a harvester passes over the top of the seed corn. Seed corn is grown with one or two rows of a male corn which pollinate three to five rows of the female seed corn. Once the pollination occurs, the male corn is unwanted and can cause contamination of the species of corn.

To prevent contamination of new hybrids of seed corn, the male corn rows are often removed or mowed down. Mowing the corn leaves the possibility of future contamination of the breed, due to debris left in the field. Complete removal of the male rows is currently done only by hand cutting. The present invention allows for the quick, complete method of removal of the male rows at a lower cost. The corn can be stored in a bin on the harvester, after being cut and chopped. The cut corn is also an excellent source of silage for livestock.

The male rows of seed corn make up approximately one-fifth of the corn in the field, which can now be saved with this invention. A readily available source of feed would make livestock production more cost effective in corn producing areas.

Recent advances in the science of corn breeding make it more critical to have a purer breed. Male corn from the previous year could produce unwanted hybrids in the seed corn, ruining the benefits of the seed corn operation. As farming becomes more precise and efficient, the need for better and newer harvesting methods arises. This invention is the next increase in the developing precision of the science of seed corn farming.

There are no known inventions that utilize this method of selectively cutting rows of corn. Currently, male seed corn rows are removed by hand cutting. No other method is known.

SUMMARY OF THE INVENTION

The present invention provides a method of removing corn with a harvester that removes selective rows out of the field. A harvester would be used which has a frame high enough to ride above the tops of the corn. Cutting, chopping, and blowing units are mounted on the sides of the harvester to remove single or double rows of corn.

The harvester is driven with the wheels between the rows of corn, to prevent damage to the corn. The harvester is driven through the seed corn field where the cutting units line up with the male rows of corn, where the male corn is taken into the cutting units, chopped, and the cut corn is transported up and into the bin at the back of the harvester. The harvester frame will drive above the three to five rows of seed corn that will remain in the field until the harvest. This requires approximately five (5) feet of ground clearance in the central portion of the frame.

The invention allows the farmer and the seed corn company to remove the male rows without damaging the seed corn rows. Rather than discharging the cut corn onto the ground where it could cause future contamination, the process can remove the plants and store them in a bin. The cut corn can be used as forage to feed cattle and other livestock. Currently, seed corn companies are paying farmers to mow down the male rows, or remove the male rows by hand cutting. The present invention completely removes the male rows, providing the cleanest field for the seed corn companies and the breeding stock. It also provides a large quantity of corn forage for livestock. This harvester creates a new product that has never been utilized.

An object of the invention is to provide a method to selectively remove the male rows from a seed corn field with a harvester. The harvester includes cutters on both sides of the invention to cut and chop, one or two rows of male corn. The chopped corn is then blown up, into a bin at the rear of the invention. In the preferred embodiment, the bin can be emptied by raising, and dumping the bin.

BRIEF DESCRIPTION OF THE DRAWINGS

The present invention will be more fully understood by reference to the following detailed description thereof when read in conjunction with the attached drawings, and wherein.

REFERENCE NUMERALS IN THE DRAWINGS

Figure 1:
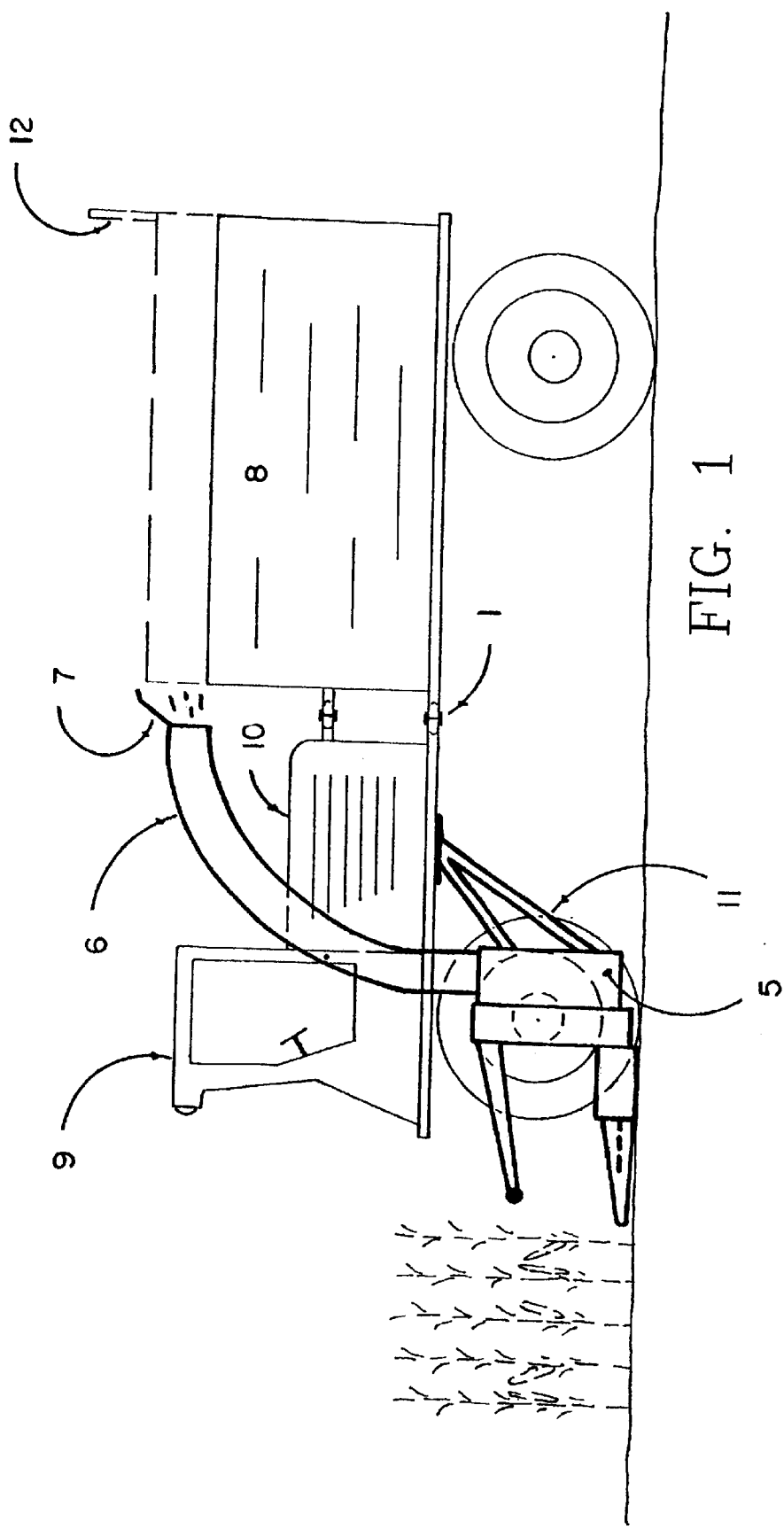
FIG. 1 is a side view of the harvester of the invention.
Figure 2:
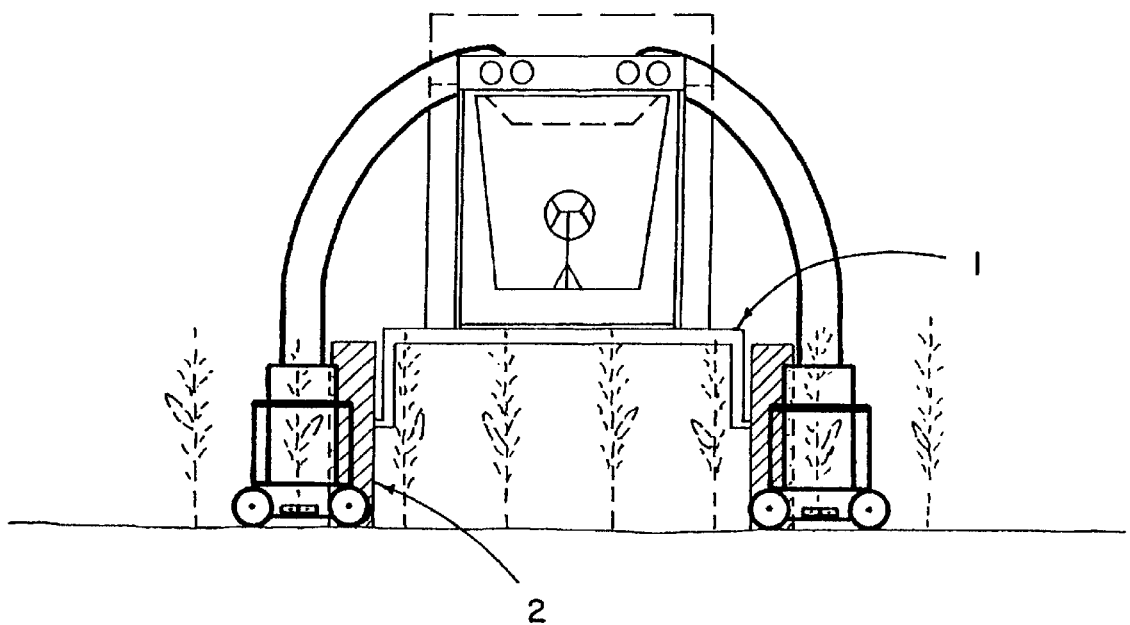
FIG. 2 is a front view of the harvester of the invention.
Figure 3:
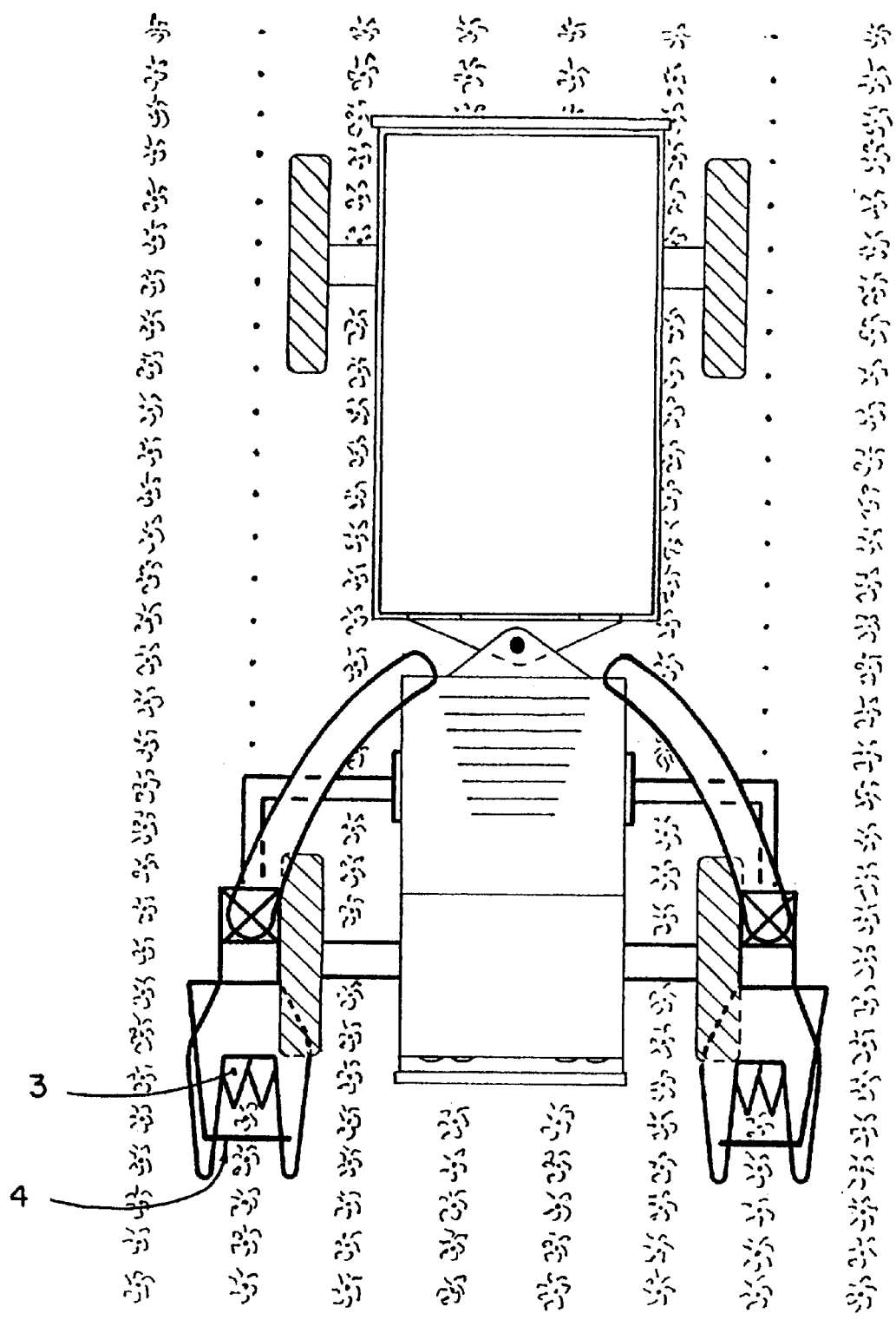
FIG. 3 is a top view of the harvester of the invention.

1 Frame
2 Wheel
3 Cutter unit
4 Deflector bar
5 Blower Unit
6 Blower Spout
7 Deflector shield
8 Bin
9 Cab
10 Engine housing
11 Support bracing
12 Bin extension

DETAILED DESCRIPTION OF THE DRAWINGS

A typical embodiment of the harvester utilized in the method of the present invention is illustrated in FIG. 1. Forward and rearward pairs of wheels 2 support a frame 1 of the harvester. A suspension system connects the wheels 2 to the frame 1. Each wheel 2 is driven by hydraulic motors. The frame 1 is elevated approximately five feet off of the ground to allow corn stalks to pass under the harvester. The frame 1 supports a cab 9 with seating and controls for the driver. Behind the cab 9, lies the engine housing 10 holding the power unit and related hydraulics and mechanics necessary to power the wheels 2, cutter units 3, blower units 5, and other items. The frame 1 is divided into two halves, connected by a pin connection. This allows the frame to pivot, giving a small turning radius.

Support bracing 11 extending off the sides of the frame 1 connects cutter units 3. Cutter units 3 of conventional nature are provided, although they are approximately thirty inches wide, for cutting a single row of seed corn. The cutter units are powered by hydraulics connected to the power unit located in the engine housing 10.

Corn stalks are pushed over by contact with the deflector bar 4 mounted forward of the cutter units 3. The bent stalks are taken into the cutter units 3, and chopped into small particles. Rearwardly of the cutter units 3, is located a blower unit 5. Fan blades inside the blower unit 5 propel the chopped particles circularly, and then out, into blower spout 6. The blower spout 6 directs the chopped particles rearwardly to a bin 8. The particles could also be directed to a wagon trailing the harvester. A deflector shield 7 directs the discharge into the bin 8, and can be adjusted from the cab to distribute the chopped particles evenly. To prevent the chopped particles from blowing out of the back of the bin 8, a bin extension 12 can be mounted at the rear.

The harvester can be modified to remove two rows of male corn on each side. The harvester is also provided with standard equipment not shown, and not essential for the purposes of the present invention.

The method of removing the selected rows of corn utilizes the harvester to remove the corn without damage to the valuable seed corn. Preferably, the male rows are removed after pollenation of the female seed corn rows, but before the plants are too tall to pass under the harvester, around five feet high.

While the invention has been illustrated with respect to several specific embodiments thereof, those embodiments should be considered as illustrative rather than limiting. Various modifications and additions may be made and will be apparent to those skilled in the art. Accordingly, the invention should not be limited by the foregoing description, but rather should be defined only by the foregoing claims.

I claim:

1. The method of harvesting mature corn planted in parallel rows in a field, said method comprising the steps of using a harvester to pick selected rows of mature corn having a height taller than about four feet, chopping the picked corn, transporting the chopped corn to a storage bin, wherein the harvester passes over the unselected rows of corn without damaging them.

2. The method of harvesting mature, male seed corn, having a height taller than about four feet, planted in parallel rows in a field with rows of female corn, said method comprising removing the male rows of corn with a harvester, wherein the harvester passes over the rows of female corn to remain in the field.

3. A method of harvesting selected rows of mature corn having a height of about four feet, from a field having rows of corn comprising selected rows and remainder rows of corn, the method comprising the steps of:
   a) driving a corn harvester comprising an elevated frame, a plurality of means for propelling, and at least one harvesting unit coupled outwardly from the frame such that the elevated frame passes substantially over the remainder rows of corn;
   b) concurrently with step a) harvesting at least one of the selected rows of corn employing the at least one harvesting unit.

4. The method of claim 3, comprising the additional step of aligning the corn harvester so that the plurality of means for propelling are aligned between the rows of corn, and so that at least one harvesting unit is aligned with at least one selected row of corn.

5. The method of claim 3, wherein the step of harvesting at least one of the selected rows of corn comprises the steps of picking at least one of the selected rows to create picked corn, chopping the picked corn to create chopped corn, and transporting the chopped corn to a storage bin.

6. A method of harvesting selected rows of mature corn having a height taller than about four feet, in a field of corn planted substantially in rows, having selected rows and remainder rows, comprising using a mechanical corn harvester to harvest the selected rows while the mechanical corn harvester passes substantially over the remainder rows.

7. In a field having rows of corn made up of selected rows of mature corn having a height taller than about four feet, and remainder rows of corn, an apparatus for harvesting configured to harvest the selected rows of mature corn while concurrently passing substantially over the remainder rows of corn, the apparatus for harvesting comprising:
   a) a mobile support frame configured such that the frame passes substantially over at least one of the remainder rows of corn without damaging the remainder rows of corn;
   b) means for propelling said apparatus for harvesting, coupled to the mobile support frame, the means for propelling being configured to propel the apparatus for harvesting without damaging the remainder rows of corn; and
   c) at least one harvesting unit coupled to the mobile support frame, being configured to harvest the selected rows of mature corn.

8. The apparatus of claim 7, further comprising means for powering coupled to the mobile support frame.

9. The apparatus of claim 7, wherein the mobile support frame is elevated so as to create a vertical clearance between the underside of the mobile support frame and the field, such that the apparatus can pass substantially over at least one of the remainder rows of corn without damaging the remainder rows of corn.

10. The apparatus of claim 7, wherein each of the harvesting units is outwardly mounted to the mobile support frame.

11. The apparatus of claim 7, wherein the means for propelling comprises at least three wheels configured to ride between the rows of corn.

12. The apparatus of claim 7, wherein each of the harvesting units is configured to substantially align with at least one selected row of corn.

13. The apparatus of claim 7, further comprising a cab coupled to the mobile support frame.

14. The apparatus of claim 7, further comprising a storage bin coupled to the mobile support frame.

15. The apparatus of claim 9, wherein the vertical clearance is approximately five feet.

16. The apparatus of claim 11, further comprising steering means operatively coupled to the wheels.

17. The apparatus of claims 14, wherein the harvesting units comprise: a cutting unit configured to cut stalks of corn from the selected rows; a chopper configured to receive the cut stalks of corn from the cutting unit and chop the stalks of corn.

18. The apparatus of claim 17, further comprising at least one conveying unit which is configured to receive the chopped stalks of corn from the harvesting units and convey the chopped stalks to the storage bin.

19. The apparatus of claim 18, wherein the conveying unit comprises a blower and a chute.

20. A corn harvester for harvesting selected rows of mature corn having a height taller than about four feet, from a field of alternating selected rows and remainder rows, without damaging the remainder rows of corn, the corn harvester comprising:
   a) a mobile support frame which is elevated vertically above the field so as to create a vertical clearance between the mobile support frame and the field, the vertical clearance being approximately the height of the remainder rows;

b) means for propelling the corn harvester; and c) at least one harvesting unit coupled to the mobile support frame.

21. The corn harvester of claim 20, further comprising means for powering the corn harvester coupled to the mobile support frame.

22. The corn harvester of claim 20, further comprising a cab mounted to the mobile support frame.

23. The corn harvester of claim 20, wherein the means for propelling comprises a plurality of wheels operatively coupled to the mobile support frame.

24. The corn harvester of claim 23, wherein the plurality of wheels are configured for alignment between rows of corn.

25. The corn harvester of claim 23, wherein the plurality of wheels are powered by hydraulics.

26. The corn harvester of claim 23, wherein each of the harvesting units comprise: a cutting unit, which cuts the selected corn; and a chopper, which chops the selected corn.

27. The corn harvester of claim 20, further comprising a storage bin coupled to the mobile support frame.

28. The corn harvester of claim 27, further comprising at least one conveyor coupled to the mobile support frame for conveying the selected corn from the at least one harvesting units to the means for storing corn.

* * * * *